3,514,431
PROCESS FOR THE PREPARATION OF
CHLOROPRENE TERPOLYMER
Shoichi Izawa, Akihiko Shimizu, Takayuki Kino, Mamoru Narui and Takeshi Hironaka, Yamaguchi, Japan, assignors to Toyo Soda Manufacturing Co., Ltd., Yamaguchi, Japan
No Drawing. Filed Jan. 27, 1969, Ser. No. 794,384
Claims priority, application Japan, Jan. 25, 1968, 43/4,525
Int. Cl. C08d 3/14
U.S. Cl. 260—80.7     1 Claim

ABSTRACT OF THE DISCLOSURE

Process for producing low temperature-resistant chloroprene-styrene-acrylonitrile terpolymers having good processability and excellent physical properties. A chloroprene-styrene-acrylonitrile terpolymer containing certain definite amounts of each component and illustrating synergistic properties is also claimed.

BACKGROUND OF THE INVENTION

Field of the invention

This invention relates to a process for producing low temperature or cold-resistant chloroprene terpolymers illustrating improved processability and excellent overall physical properties.

Description of the prior art

It is well known that an improvement in the cold-resistance of chloroprene rubbers can be achieved by disturbing their crystallinity and retarding their rate of crystallization. Copolymerization of chloroprene with one or two copolymerizable components is often practiced to reduce the crystallinity thereof. However, such copolymerization methods generally deteriorate some useful physical properties of the resulting copolymers, generally in proportion to the amount of comonomers. Further, some comonomers, e.g., 2,3-dichlorobutadiene-1,3, increase the adhesiveness of the rubbers formed, thereby making more difficult any roll operation in subsequent processing.

With respect to styrene and acrylonitrile, the comonomers employed in the present invention, chloroprene/styrene and chloroprene/acrylonitrile copolymers are well known. For these copolymers, it is known that some of the physical properties thereof are considerably lowered by copolymerization, as explained above.

For instance, with chloroprene/styrene copolymers, processability is substantially improved, but the physical properties thereof are deteriorated.

With a chloroprene/acrylonitrile copolymer, processability is considerably lowered and most physical properties are deteriorated. However, the oil resistance thereof is remarkably improved.

The present invention provides a process for forming a chloroprene/styrene/acrylonitrile copolymer illustrating properties far and above those illustrated by similar copolymers in the prior art.

SUMMARY OF THE INVENTION

The present invention discloses a process for the production of a cold-resistant chloroprene terpolymer which illustrates excellent processability and excellent physical properties. The process basically comprises copolymerizing chloroprene, styrene, and acrylonitrile at a temperature within the range of from about 30 to about 65° C. The resultant terpolymer must contain styrene and acrylonitrile units which fall within the following simultaneous inequalities:

$$St > 0.2 \quad 0.2 < AN < 3.0$$
$$0.7 - AN < St < 4.0 - 1.7 AN$$

St and AN represent, respectively, the weight percents of styrene and acrylonitrile units with respect to the total amount of polymer. Obviously, the balance of the polymer will comprise chloroprene.

The invention also comprises a novel chloroprene/styrene/acrylonitrile terpolymer wherein the individual components are present within the ranges defined by the above enumerated simultaneous inequalities. The terpolymer illustrates improved properties which are synergistic in their magnitude.

The principal object of the present invention is thus to provide a novel cold-resistant chloroprene terpolymer having improved processability and excellent physical properties, and to provide a process for the production of said chloroprene terpolymer.

DESCRIPTION OF THE PREFERRED EMBODIMENTS

As heretofore indicated, the present invention provides a process for the production of a low temperature or cold-resistant chloroprene terpolymer which illustrates improved processability and excellent physical properties. More particular, the present invention provides a process for producing a cold-resistant chloroprene terpolymer which contains styrene and acrylonitrile units in the terpolymer in a strictly regulated amount. The invention, of course, further provides a novel terpolymer per se, the terpolymer illustrating many physical properties of enhanced desirability, such as tensile strength, resilience, oil resistance, etc. It is believed that the unique optimization of the many physical properties of the present invention is enabled by synergism resulting between the chloroprene/styrene/acrylonitrile units when the styrene and acrylonitrile units present in the terpolymer are maintained within a range bounded by the following simultaneous inequalities:

$$St > 0.2 \quad 0.2 < AN < 3.0$$
$$0.7 - AN < St < 4.0 - 1.7 AN$$

In the above formula, St and AN are, respectively, the weight percent of styrene and acrylonitrile units, based on the total amount of polymer.

We have found that copolymerization of chloroprene with styrene and acrylonitrile yields a novel low-crystalline terpolymer, in which the improved processability of the chloroprene/styrene copolymer and the excellent oil resistance of the chloroprene/acrylonitrile are retained, while many useful properties such as tensile strength and resilience are improved (which could not be expected with the original copolymers). Further, the other physical properties of the terpolymer are equal to or better than those of chloroprene homopolymers, the terpolymer showing no sign of degradation in those properties which is often the case with conventional copolymerization. These unexpected results are obtained only when the polymerization temperature and the amounts of the comonomer units in the terpolymer are maintained within certain strictly-regulated ranges as provided by the present invention.

Such a combination of improved physical properties would never be expected of the described original copolymers. Further, even with chloroprene-styrene-acrylonitrile terpolymers, there occurs a deterioration in physical properties similar to that brought about by conventional copolymerization processes if the comonomer compositions are beyond the ranges described in the present invention.

These facts suggest that only when the amounts of each comonomer unit falls into a definite range, will a synergism between the constituent comonomers yield said excellent physical properties in the terpolymers.

Further, if said chloroprene/styrene and chloroprene/acrylonitrile copolymers are merely mechanically blended with each other, though the composition of the resulting polymer mixture is adjusted to within the specific ranges, the excellent physical properties will not be produced.

In accordance with the present invention, the strictly regulated ranges of the composition for the styrene and acrylonitrile units in the terpolymer are defined by the following simultaneous inequalities:

$$St>0.2 \text{ and } 0.2<AN<3.0 \quad (1)$$

$$0.7-AN<St<4.0-1.7AN \quad (2)$$

wherein St and AN denote the weight percent of styrene and acrylonitrile units contained in the chloroprene terpolymer, respectively.

When the amounts of said comonomers in said terpolymers are less than the values defined in the above inequalities, improved processability and said oil resistance, which are respectively the characteristics of said original copolymers, will not be yielded in the terpolymer, the cold-resistance is deteriorated, and good physical properties are not exhibited. On the other hand, when the amounts thereof exceed the above ranges, although one of the two most important properties will be exhibited, until the amounts of said comonomer units reach certain values. However, for such "exceeded" composition ranges, the synergism among the constituent comonomers does not work effectively and polymers of inferior properties result (certain values being $AN5$ and $St2$).

It should be noticed that in comparison to commercial copolymers the contents of comonomers in the terpolymers of the present invention are exceptionally low in that the maximum content of the styrene and acrylonitrile units are 3.65% and 3.0%, respectively.

From a quantitative viewpoint, said comonomers in the present invention can be classified as additives. In fact, if the amounts of the comonomers in the terpolymers are increased to the levels of conventional copolymers, the superior physical properties are eliminated. This indicates that the process of the invention is fundamentally different in its function from conventional copolymerization processes.

According to the present invention, polymerization temperatures are within the range of 30 to 65° C., preferably 40 to 55° C.

Although lower temperatures during polymerization will yield products of some improved physical properties, much more time is required for polymerization. Further, the cold-resistance of the resulting copolymer is somewhat lowered. Consequently, a polymerization temperature of 30° C. at the lowest is needed. On the other hand, polymerization temperatures greater than 65° C. yields polymers of inferior physical properties.

An emulsion copolymerization process as that generally used for producing polychloroprene can be used for the polymerization process. Commonly employed agents, e.g., an emulsifier, a stabilizer, a catalyst and other kinds of additives may be used in the process of the present invention. Raw materials, e.g., chloroprene, styrene and acrylonitrile which are produced by common purification processes may be used satisfactorily. Further, as the addition process for the monomers, the total amount of the three components mixture may be polymerized from a mixture of all three, or one or two components may be continuously added into a polymerization system during polymerization. The copolymer obtained in this last method, if the copolymerization components are present in the strictly regulated range, will conform to the present invention.

Practical methods of practicing the present invention are explained by the examples below. These do not limit the scope of the present invention.

Unless otherwise particularly described, "parts" means "parts by weight."

EXAMPLE I

Copolymerization by composition ratios which are set forth in Table I was carried out at a temperature of 50° C. in autoclave of 1 liter volume equipped with an agitator.

Table I

| | Parts |
|---|---|
| Total amount of monomer | 250 |
| Disproportional rosin soap | 10.7 |
| FNS [1] | 1.0 |
| NaOH | 1.0 |
| $Na_2SO_4$ | 0.75 |
| Water | 255 |
| Diisopropylxanthogendisulfide | 1.5 |

[1] Condensation product of formaldehyde and sodium naphthalene sulphonic acid.

All polymerizations were carried out in a nitrogen atmosphere and the specific gravity of latex was measured to determine conversion. A short stopping agent, e.g., phenothiazine (phenols may also be used) was added at a conversion of 70 percent and the polymerization was short stopped.

Unreacted monomers, after short stopping the polymerization, were recovered by means of vacuum distillation and latex was coagulated from the system by acidification with acetic acid and dried by conventional processes.

The amounts of styrene and acrylonitrile units in the terpolymer were determined by the elementary analysis of nitrogen and chlorine.

TABLE II

| Sample No. | Homopolymer of polychloroprene | 1 | 2 | 3 | 4 | 5 | 6 | 7 | Cold-resistant polychloroprene on the market |
|---|---|---|---|---|---|---|---|---|---|
| Amount of styrene unit in the polymer (wt. percent) | 0 | 0 | 4.6 | 1.7 | 1.7 | 1.7 | 0.4 | 4.6 | |
| Amount of acrylonitrile unit in the polymer (wt. percent) | 0 | 3.9 | 0 | 0.1 | 0.3 | 1.1 | 1.1 | 3.9 | |
| Viscosity ($\eta$) [1] | 1.26 | 1.18 | 1.15 | 1.23 | 1.23 | 1.16 | 1.29 | 1.20 | 1.28 |
| Crystallizing time of the terpolymer (min.) [2] | 500 | >10,000 | >10,000 | 3,400 | 5,300 | 8,500 | 5,100 | >10,000 | 4,900 |
| Processability: | | | | | | | | | |
| Take-up condition of roll [3] | 3 | 3 | 3 | 4 | 4 | 4 | 4 | 3 | 4 |
| Separable condition of roll [4] | 3 | 2 | 2 | 2 | 3 | 2 | 3 | 3 | 3 |
| Surface condition [5] | 3 | 2 | 3 | 2 | 3 | 3 | 3 | 3 | 2 |
| Elongation of vulcanizate (percent) | 485 | 530 | 590 | 540 | 550 | 540 | 540 | 560 | 540 |
| Tensile strength of vulcanizate (kg./cm.²) | 240 | 219 | 216 | 221 | 239 | 239 | 232 | 216 | 229 |
| Resilient elasticity of vulcanizate (percent) | 63 | 61 | 60 | 61 | 64 | 65 | 64 | 64 | 59 |
| Oil resistance [6] | 3 | 4 | 2 | 3 | 4 | 4 | 4 | 4 | 3 |

[1] Measured at 40° C. in benzene.
[2] Measured as the time required for a 10 point rise in the Shore hardness at 20° C.
[3] Condition at 1 minute after winding up the rubber round the roll, defined as: 4. Rolling condition is good and the surface of the rubber is smooth. 3. Flatness of rubber surface is slightly poor. 2. Rolling condition is bad.
[4] Measured during sheeting. 4. The sheet is released from a roll surface without any resistance. 3. The sheet is released with some resistance. 2. Sample is very adhesive, and the sheet is stretched.
[5] Measured after sheeting. 4. The surface is smooth and lustrous. 3. The surface is smooth. 2. The surface is coarse and attached with visible wrinkles.
[6] Measurement of the degree of swelling in ASTM Oil No. 3. 4. Excellent. 3. Good. 2. Rather poor.

The results are set forth in Table II, and samples within the scope of the present invention involve three samples of Samples Nos. 4, 5, and 6. Compared with samples outside the scope of the present invention, Samples 4, 5 and 6 illustrate superior properties.

EXAMPLE II

A sample analogous to Sample 5 of Example I was prepared by changing the polymerization temperature in the process of Example I. Crystallization times and values of the tensile strength of the resulting copolymer are set forth in Table III.

TABLE III

| Polymerization temperature (° C.) | 20 | 30 | 50 | 65 | 80 |
|---|---|---|---|---|---|
| Crystallization time (min.) | 900 | 1,900 | 8,500 | 10,000 | 10,000 |
| Tensile strength (kg./cm.$^2$) | 245 | 237 | 232 | 218 | 175 |

EXAMPLE III

This example was carried out by the method of Example I but by changing the amounts of the styrene and acrylonitrile units. The results are shown in Table IV. The method of testing the physical properties was the same as that shown in Table II.

TABLE IV

| Sample No. | 1 | 2 | 3 | 4 |
|---|---|---|---|---|
| Amount of styrene units in the polymer (wt. percent) | 0.2 | 0.2 | 0.5 | 3.6 |
| Amount of acrylonitrile units | 0.5 | 2.4 | 0.2 | 0.2 |
| Viscosity ($\eta$) [1] | 1.25 | 1.26 | 1.23 | 1.19 |
| Crystallization time of the terpolymer (min.) [2] | 3,000 | 8,100 | 3,100 | 710,000 |
| Processability: | | | | |
| Take-up condition of roll [3] | 4 | 4 | 4 | 4 |
| Separation condition of roll [4] | 3 | 2 | 2 | 3 |
| Surface condition [5] | 3 | 3 | 3 | 3 |
| Elongation of vulcanizate (percent) | 560 | 540 | 560 | 550 |
| Tensile strength of vulcanizate (kg./cm.$^2$) | 245 | 238 | 243 | 236 |
| Resilient elasticity of vulcanizate (percent) | 63 | 65 | 64 | 65 |
| Oil resistance | 4 | 4 | 4 | 4 |

See footnotes in Table II.

To further aid in an understanding of the present invention, the process of the present invention is preferably carried out at a pressure of from about 0 to about 10 kilograms per square centimeter (gauge), normal atmospheric pressures having been found to be most preferable. The reaction generally is conducted within a period of time ranging from about 1 to about 5 hours, with 2–3 hours generally insuring the requisite degree of reaction. In the examples, a 3-hour reaction period was utilized.

The amount of chloroprene found in the process mixture is the same as that included in the final terpolymer. However, with respect to the acrylonitrile (AN) and styrene (St), the amount present in the reaction mixture is generally about double that included in the final terpolymer. It will be appreciated by one skilled in the art that as the amount of AN and St present in the bath is varied, the amount present in the final terpolymer will also vary. Of course, it has been found that an emulsion polymerization is most preferred and generally is the only type of polymerization which will yield completely acceptable results.

To further define the term "disproportionated rosin soap" this type of material basically comprises disproportionated abietic acid, and is known as a karium or natrium salt of a mixture of prepared tetrahydroabietic acid, dihydroabietic acid and dehydroabietic acid. In the example of the present invention, a karium salt 80 percent solution was used (trade name Dresinate 214; manufactured by the Hercules Powder Company).

What we claim is:

1. A composition comprising a solid chloroprene-styrene-acrylonitrile terpolymer wherein the styrene and acrylonitrile units are presented in the terpolymer in an amount defined by the following simultaneous inequalities:

$$St>0.2 \qquad 0.2<AN<3.0$$
$$0.7-AN<St<4.0-1.7AN$$

wherein St and AN represent, respectively, the weight percent of the styrene and acrylonitrile units, based on the total amount of terpolymer, the balance being chloroprene units.

References Cited

UNITED STATES PATENTS

| 2,066,330 | 1/1937 | Carothers et al. | 260—2 |
| 2,384,547 | 9/1945 | Fryling | 138—55 |
| 2,399,407 | 4/1946 | Wagner | 260—80.7 |

JOSEPH L. SCHOFER, Primary Examiner

J. C. HAIGHT, Assistant Examiner

U.S. Cl. X.R.

260—80.6